United States Patent [19]
Sullivan et al.

[11] Patent Number: 5,414,565
[45] Date of Patent: May 9, 1995

[54] TILTING KINEMATIC MOUNT

[76] Inventors: Mark T. Sullivan, 1661 18th Ave., San Francisco, Calif. 94122; Joseph A. Mansfield, 531 NW. Canyon Dr., Redmond, Oreg. 097756

[21] Appl. No.: 800,580

[22] Filed: Nov. 27, 1991

[51] Int. Cl.$^6$ ............................................. G02B 7/18
[52] U.S. Cl. ............................... 359/872; 359/225; 359/849; 359/896
[58] Field of Search ............ 359/197, 198, 199, 200, 359/223, 224, 225, 849, 872, 896, 819, 821, 822

[56] References Cited

U.S. PATENT DOCUMENTS

| | | | |
|---|---|---|---|
| 3,891,299 | 6/1975 | Rushing | 359/223 |
| 4,060,315 | 11/1977 | Heinz | 359/872 |
| 4,290,574 | 9/1981 | Archibald | 248/177 |
| 4,533,219 | 8/1985 | Aldrich | 359/872 |
| 4,655,563 | 4/1987 | Plante et al. | 359/849 |
| 4,660,941 | 4/1987 | Hattori et al. | 359/224 |
| 4,771,545 | 9/1988 | Hisayasu et al. | 33/299 |
| 4,842,397 | 6/1989 | Eisler | 350/634 |
| 4,929,073 | 5/1990 | LaPlante et al. | 350/609 |
| 4,973,145 | 11/1990 | Kirkwood et al. | 359/872 |
| 5,099,352 | 3/1992 | Yamamoto et al. | 359/223 |
| 5,110,195 | 5/1992 | Loney | 359/224 |

FOREIGN PATENT DOCUMENTS

| | | | |
|---|---|---|---|
| 3837770 | 1/1970 | Germany | 359/871 |
| 3901848 | 11/1989 | Germany | 359/872 |
| 1007070 | 3/1983 | U.S.S.R. | 359/871 |

OTHER PUBLICATIONS

Indexing system for optical beam steering Sullivan, et al., Published Nov. 28, 1990, pp. 361-372.
The Scientific Papers of James Clerk Maxwell, V. 2 Niven, Dover Pubs, pp. 506-508.

*Primary Examiner*—Ricky D. Shafer
*Attorney, Agent, or Firm*—Skjerven, Morrill, MacPherson, Franklin & Friel; David E. Steuber

[57] ABSTRACT

A tilting kinematic mount having optics which may be precisely positioned so as to direct light or other energy to a number of measuring devices. Optic carrying tilting plates, interleaved with stationary plates are moved by linear actuators. An arrangement of balls and grooves establishes positioning of the tilting plates in a kinematic mount relative to the stationary plates, thus achieving the precise rearrangement of optical elements relative to a central axis and the redirection of the energy beam onto the sensing devices.

9 Claims, 3 Drawing Sheets

TILTING KINEMATIC MOUNT

FIELD OF THE INVENTION

The present invention relates to a precision, multi-positional mounting system for optics, using kinematic principles to achieve rapid and precise location of the optical element.

DESCRIPTION OF RELATED ART

The use of kinematic principles in precisely positioning optical instruments by means of six points of contact restraining activity in all six degrees of freedom of motion is well known by those versed in the art. However, previous attempts at producing an ultra-precise mounting able to rapidly shift between a plurality of positions have stressed the use of high-precision, machined components combined with electromechanical or detent means to achieve the proper positioning.

The cost of manufacture of the high-precision components is an adverse factor. The additional weight and complexity of the parts leads also to wear and reliability problems. When placed in a hostile environment, such as that encountered in non-terrestrial applications, simplicity, low-mass and high dependability are clearly desirable characteristics.

SUMMARY OF THE INVENTION

The present invention overcomes the problems noted above by providing a simple six-point mount, placed according to kinematic principles, for each desired position of the optic. In the preferred embodiment, two optics are placed, each in its own annular tilt plate. The two tilt plates are connected by a plurality of linear actuators and are positioned movably in the housing so that they are capable of tilting. When one actuator is contracted while two others are extended, the tilt plates are tilted with respect to each other. Three rigid annular base plates are placed superior, intermediate and inferior to the two tilt plates and attached to a rigid external housing. The two tilt plates have a plurality of posts or balls with hemispherical distal ends (hereinafter called "balls") placed on each superior and inferior side. The superior baseplate has either vee shaped grooves or protuberances into which vees have been formed or a plates and parallel rods assembly (hereinafter called "vees") placed on its inferior surface. The inferior base plate has vees placed on its superior surface. The intermediate base plate has vees placed on both its superior and inferior surface. The respective vees and balls are placed such that when one linear actuator is contracted while the two corresponding actuators are extended, two balls from the superior tilt plate interdigitate with two vees of the superior base plate, while one ball of the superior tilt plate contacts the corresponding vee of the superior surface of the intermediate base plate. In accordance with known principles of kinematic mounting, each ball interdigitates with a vee and contacts the vee at two discrete points. In this manner a six point kinematic contact is obtained from the three paired ball and vee assemblies.

It may be seen that, in this configuration, the superior tilt plate will be held rigidly and precisely in place, according to kinematic principles, by the six point contacts between the balls and vees. It may also be seen that the same position of the actuators precisely positions the inferior tilt plate. If the positions of the triad of actuators is reversed, the result is the precise, kinematic mounting of the tilt plates with the area of approximation 180 degrees opposite.

The tilt plates are positioned movably in the housing by one of a number of means, such as flexure rods having respective ends attached to the tilt plate and the external housing.

As each triad of actuators is energized, the optics in the two tilt plates are put into a different and precise position. Assuming that a dichroic mirror is emplaced in the superior tilt plate and a compensating lens is emplaced in the inferior tilt plate, light traveling downward along the central axis can be precisely, repeatably and rapidly reflected to a plurality of sensors arrayed radially about the external housing as well as transmitted to a sensor on the central axis, attached to the external housing.

A number of advantages arise from the invention. Compared with other devices addressing the problem, the invention uses comparatively few parts, and friction is reduced due to the small number of moving parts, particularly advantageous in cryogenic or other hostile environments. The use of a true kinematic mount results in great accuracy in placement with minimal wear of the bearing surfaces. Where exotic materials are used, material may be conserved due to the relatively small bearing surfaces.

Other aims and advantages as well as a more complete understanding of the present invention will appear from the following explanation of exemplary embodiments and the accompanying drawings thereof.

DETAILED DESCRIPTION OF THE INVENTION

Figure 1:
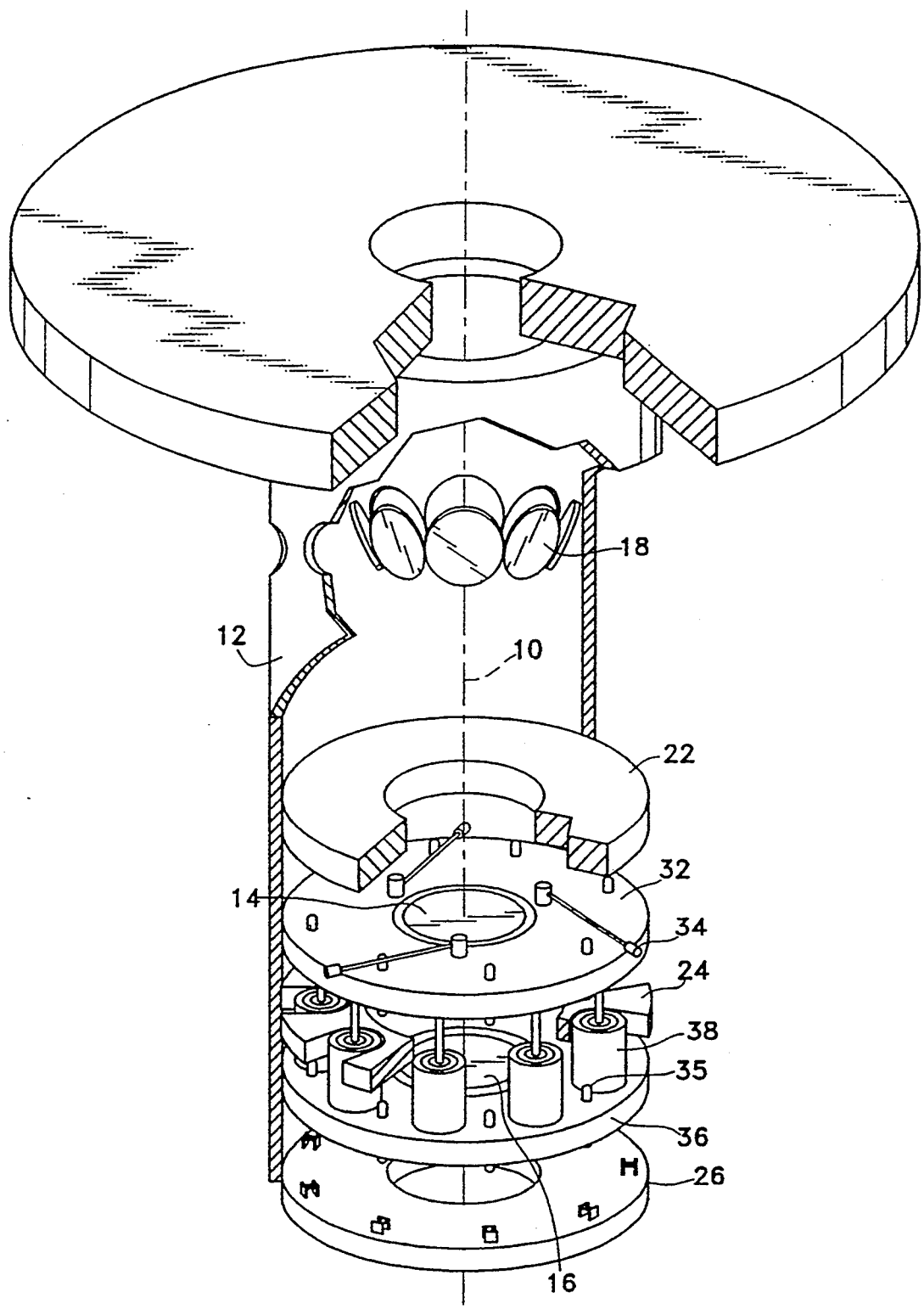
FIG. 1 shows a cut-away view of the present invention as applied to the tertiary mirror of a reflecting telescope.

As illustrated in FIG. 1, a tilt mirror mount assembly in a telescope includes a housing 12, placed about a plurality of optical elements, in this case, a tertiary mirror 14, a compensator 16 and one or more quaternary mirrors 18. Various elements are arrayed radially around a main axis 10 of the telescope. The optical elements direct energy collected by the telescope and directed into the housing 12 along the main telescope axis 10 into a plurality of sensors arrayed radially about the housing 12. Quarternary mirrors 18 may or may not be used, depending upon the placement of the sensors.

Figure 2:
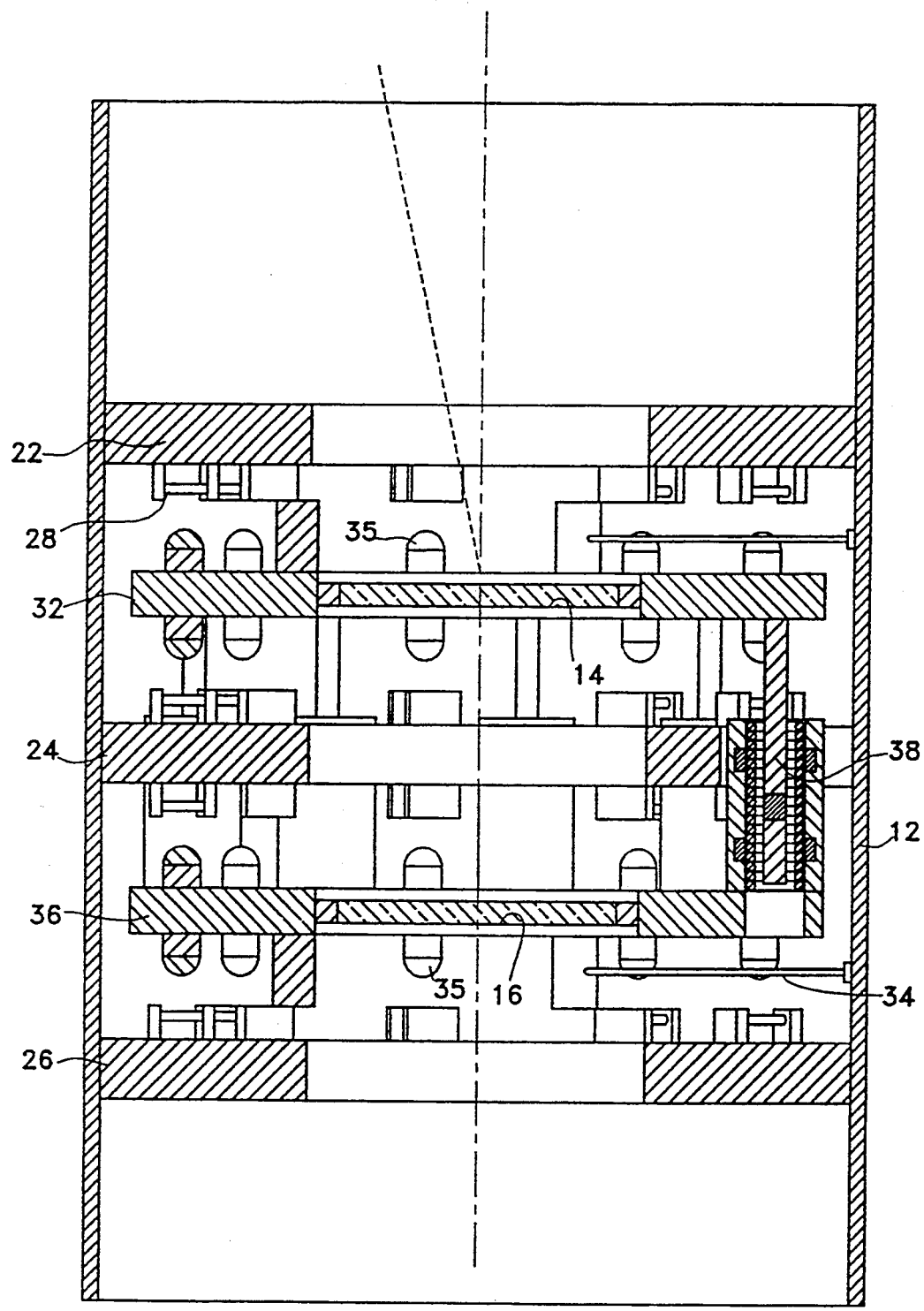
FIG. 2 shows a cross section of the invention along the axis of the telescope, with the actuators in a neutral configuration.
Figure 3:
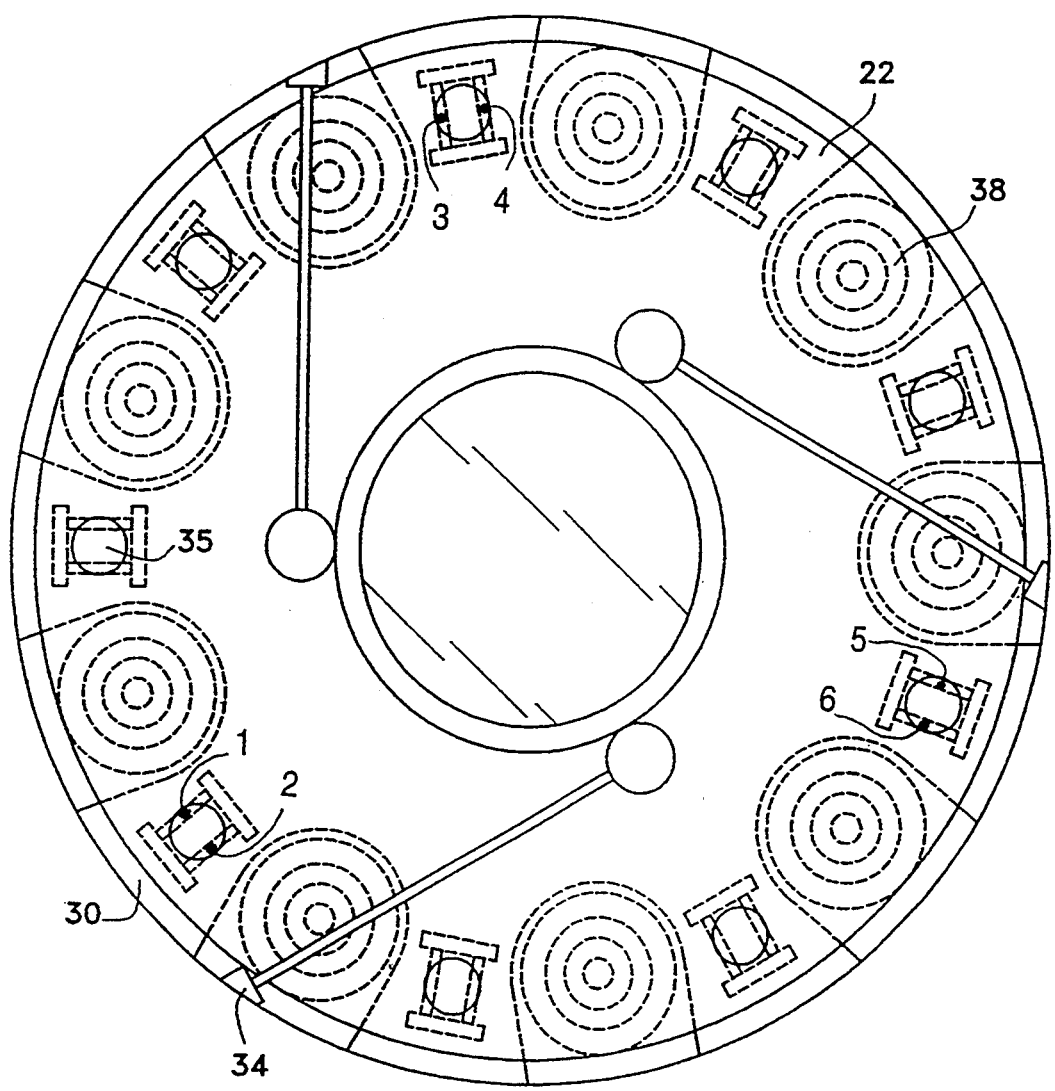
FIG. 3 shows a top schematic section of the invention showing the preferred positioning of the actuators, vees and balls for rotation about an axis running from the top of the figure to the bottom. Note that while the figure shows parallel rods comprising the vees and tangential rod flexures comprising the suspensory means, the invention contemplates the use of various means to fulfill these functions.

Attached to housing 12 are a first baseplate 22, a second baseplate 24 and a third baseplate 26. Attached to the inferior surface of the first baseplate 22 are a plurality of vees 28 as shown in FIG. 2. A vee 28 may be comprised of a plates and parallel rods assembly 30 as shown in FIG. 3, a vee shaped notch cut into the material of the baseplate, or preferably, a post with vee shaped notch. A plurality of vees 28 are arrayed upon both the superior and inferior surfaces of the second baseplate 24. A plurality of vees 28 are arrayed upon the superior surface of the third baseplate 26.

Positioned between first baseplate 22 and second baseplate 24 is a first tilt plate 32. The first tilt plate 52 is positioned relative to the housing 12 by a suspension means, here a plurality of flex rods 34, the respective ends of which are attached to the housing 12 and to the first tilt plate 32. A plurality of posts or balls 35 with hemispherical distal ends (hereinafter called "balls") are arrayed on both the superior and inferior surfaces of the first tilt plate 32.

Positioned between the second baseplate 24 and third baseplate 26 is a second tilt plate 36. The second tilt plate 36 is positioned relative to the housing 12 by a suspension means similar to flex rods 34. A plurality of balls 35 are positioned on the second tilt plate 36 similar to those on the first tilt plate 32.

Connecting first tilt plate 32 and second tilt plate 36 are a plurality of linear actuators 58. These actuators may be of the voice coil type, or preferably, the two-position-detent type. As shown, the bodies of the actuators 58 pass through, without contacting, the second baseplate 24. Flexural joints are used at the tilt plate/actuator interfaces. In an alternative embodiment, actuators 38 are attached to second baseplate 24.

The preferred embodiment admits of eighteen separate and distinct positions, with nine actuators 38 positioned as shown on FIG. 5. The position of the interdigitated balls and vees creating the kinematic mount for the first tilt plate 52 for one optic position is shown in FIG. 5. Note that the embodiment allows, but does not require, that the contacting vees and balls be positioned at 120 degree intervals.

In operation, the tilting of the optics into the desired position is accomplished by the simultaneous extension of one actuator 58 and the contraction of the opposite two actuators 58 or the extension of two actuators 58 and the contraction of the opposite actuator 38. This action tilts the two tilting plates 32 and 36 with respect to each other. The same effect may be had for a single tilt plate by attaching the actuators to one of the base plates rather than to a tilt plate. The appropriate ball or balls on the superior surface of the first tilt plate 52 are placed into contact with the opposing vees of the inferior surface of the first baseplate 22.

The appropriate ball or balls on the inferior surface of the first tilt plate 32 are placed into contact with the opposing vees of the superior surface of the second baseplate 24. For example, when one linear actuator is contracted, while the two other actuators are extended, two balls from the superior surface of first tilt plate 32 contact the two vees of the inferior surface of first baseplate 22, and one ball of the inferior surface of first tilt plate 32 contacts the corresponding vee of the superior surface of the second baseplate 24. In this way, three paired ball and vee assemblies are obtained wherein in each assembly, the ball interdigitates with the vee and contacts the vee at two discrete points. This creates a kinematic mount providing six points of contact (two at each vee, shown as points 1–6 in FIG. 3) which restrain movement along all six axes, thereby putting the first tilt plate 32 in a distinct and reproducible position relative to the housing 12. The second tilt plate 36 is positioned in a like manner to the first tilt plate 32. In the preferred embodiment, the vees are formed by cutting the vee into a post of material of suitable hardness which is then attached to the appropriate baseplate, in a like manner, the balls are formed out of suitably hardened material and then attached to the appropriate tilt plate. In another embodiment, the vees are formed from a plates and parallel rods assembly. The assembly includes two plates having two rods substantially parallel to each other and to the surface of the appropriate baseplate.

Note that the placement of the vees 28 and the balls 55 on the various plates may be reversed.

What is claimed is:

1. A multi-positional optic mount, comprising:
   a tilt plate, said tilt plate carrying an optical element;
   means for movably suspending said tilt plate within a housing such that said tilt plate has six degrees of freedom;
   a plurality of baseplates rigidly attached to the interior of said housing;
   means for tilting said tilt plate;
   means for providing contact between said tilt plate and at least two of said baseplates, said means for providing contact being configured to provide six and only six points of contact between said tilt plate and at least two of said baseplates, said six points of contact constraining said tilt plate at a precise, reproducible position relative to said housing.

2. A mount according to claim 1 in which said means for tilting said tilt plate is comprised of linear actuators.

3. A mount according to claim 2 in which said means for providing contact is comprised of three assemblies, each assembly providing two points of contact, each assembly comprising a ball and a vee, wherein the ball interdigitates with the vee and the ball contacts the vee at two discrete points, two of said assemblies being positioned between said tilt plate and one of said baseplates and one of said assemblies being positioned between said tilt plate and the other of said baseplates.

4. A mount according to claim 3 in which said means for movably suspending said tilt plate comprises rigidly mounted rod flexures.

5. A mount according to claim 4, said mount having a main axis, said mount further comprising mirrors fixed radially with respect to the main axis of the mount so as to decrease an angle of reflection of an energy beam.

6. A mount as in claim 1 wherein said means for providing contact comprises a plurality of balls placed radially on a surface of said tilt plate and a plurality of vees placed on a surface of one of said baseplate each of said balls being capable of fitting into one of said vees to form two points of contact.

7. A mount as in claim 6 wherein said vees are formed from an assembly including parallel and said balls are formed from hemispheres.

8. A mount as in claim 1 wherein said means for providing contact comprises a plurality of vees placed radially on a surface of said tilt plate and a plurality of balls placed on a surface of one of the baseplates, each of said balls being capable of fitting into one of said vees to form two points of contact.

9. A mount according to claim 1 wherein said mount further comprises at least one additional tilt plate wherein (i) said additional tilt plate is positioned such that at least one baseplate is interposed between said tilt plate and said additional tilt plate and (ii) said means for tilting passes through said baseplate.

* * * * *

UNITED STATES PATENT AND TRADEMARK OFFICE
CERTIFICATE OF CORRECTION

PATENT NO.   : 5,414,565
DATED        : May 9, 1995
INVENTOR(S)  : Mark T. Sullivan and Joseph A. Mansfield It is certified that error appears in the above-identified patent and that said Letters Patent is hereby corrected as shown below:

Col. 3, line 6, delete "52" and insert --32--.

Col. 3, lines 21, 38, 39 delete "58" and insert --38--.

Col. 3, line 45 delete "52" and insert --32--.

Col. 4, line 53, Claim 7 after "parallel" insert --rods--.

Signed and Sealed this

Twenty-eighth Day of November 1995

Attest:

BRUCE LEHMAN

*Attesting Officer*   *Commissioner of Patents and Trademarks*